(12) United States Patent
Koeten et al.

(10) Patent No.: US 8,819,768 B1
(45) Date of Patent: Aug. 26, 2014

(54) SPLIT PASSWORD VAULT

(76) Inventors: Robert Koeten, Menlo Park, CA (US); Nicolas Popp, Menlo Park, CA (US)

( * ) Notice: Subject to any disclaimer, the term of this patent is extended or adjusted under 35 U.S.C. 154(b) by 36 days.

(21) Appl. No.: 13/341,205

(22) Filed: Dec. 30, 2011

Related U.S. Application Data

(60) Provisional application No. 61/482,192, filed on May 3, 2011.

(51) Int. Cl.
*H04L 29/06* (2006.01)

(52) U.S. Cl.
USPC ............ 726/1; 726/8; 713/165; 713/166; 713/167; 713/183; 713/184; 713/185; 380/44; 380/45; 380/270

(58) Field of Classification Search
USPC ............... 726/1–3, 8; 380/270, 44–45; 713/183–185, 165–167
See application file for complete search history.

(56) References Cited

U.S. PATENT DOCUMENTS

| | | | |
|---|---|---|---|
| 7,444,476 B2 * | 10/2008 | Gnanasabapathy et al. | 711/141 |
| 7,734,045 B2 * | 6/2010 | Sandhu et al. | 380/44 |
| 7,870,294 B2 | 1/2011 | Braddy et al. | |
| 8,079,066 B1 * | 12/2011 | Cordell et al. | 726/5 |
| 8,285,681 B2 | 10/2012 | Prahlad et al. | |
| 8,312,270 B1 | 11/2012 | Chou et al. | |
| 8,544,058 B2 | 9/2013 | Lim | |
| 2004/0039945 A1 * | 2/2004 | Oda | 713/201 |
| 2006/0156385 A1 * | 7/2006 | Chiviendacz et al. | 726/2 |
| 2006/0182276 A1 * | 8/2006 | Sandhu et al. | 380/44 |
| 2007/0088683 A1 * | 4/2007 | Feroglia et al. | 707/4 |
| 2007/0136573 A1 | 6/2007 | Steinberg | |
| 2007/0214126 A1 * | 9/2007 | Kikinis | 707/3 |
| 2008/0077982 A1 * | 3/2008 | Hayler et al. | 726/12 |
| 2008/0181399 A1 * | 7/2008 | Weise et al. | 380/44 |
| 2008/0222707 A1 | 9/2008 | Pahturi et al. | |
| 2009/0199277 A1 * | 8/2009 | Norman et al. | 726/5 |
| 2009/0249439 A1 | 10/2009 | Olden et al. | |
| 2009/0300706 A1 | 12/2009 | Ray et al. | |
| 2010/0030746 A1 * | 2/2010 | Steelberg et al. | 707/3 |
| 2010/0031043 A1 * | 2/2010 | Burger et al. | 713/170 |
| 2010/0082713 A1 | 4/2010 | Frid-Nielsen et al. | |
| 2010/0146583 A1 | 6/2010 | Prehofer et al. | |
| 2010/0192196 A1 | 7/2010 | Lee | |
| 2010/0202609 A1 * | 8/2010 | Sandhu et al. | 380/44 |
| 2011/0113471 A1 | 5/2011 | Hjelm et al. | |

(Continued)

OTHER PUBLICATIONS

Imprivata, Inc., Imprivata OneSign® Release 4.1, A Platform Overview, 2008, pp. 1-36.

(Continued)

*Primary Examiner* — Kambiz Zand
*Assistant Examiner* — Tongoc Tran
(74) *Attorney, Agent, or Firm* — Lowenstein Sandler LLP

(57) ABSTRACT

A cloud service access and information gateway receives, from a user device, a request to access a cloud service. The cloud service access and information gateway determines an identity of a user making the request to access the cloud service and compares the identity of the user to a password vault control policy. The cloud service access and information gateway determines, based on the comparing, one or more sections of a split password vault to which the user has access. The split password vault comprises a first section storing a first set of log-in credentials and a second section storing a second set of log-in credentials.

20 Claims, 7 Drawing Sheets

(56) References Cited

U.S. PATENT DOCUMENTS

| | | | |
|---|---|---|---|
| 2011/0196751 A1* | 8/2011 | Steelberg et al. | 705/14.73 |
| 2011/0209195 A1 | 8/2011 | Kennedy | |
| 2012/0023554 A1 | 1/2012 | Murgia et al. | |
| 2012/0023556 A1 | 1/2012 | Schultz et al. | |
| 2012/0023568 A1* | 1/2012 | Cha et al. | 726/10 |
| 2012/0131336 A1* | 5/2012 | Price et al. | 713/165 |
| 2012/0222084 A1 | 8/2012 | Beaty et al. | |
| 2012/0272249 A1 | 10/2012 | Beaty et al. | |
| 2012/0297190 A1* | 11/2012 | Shen et al. | 713/168 |

OTHER PUBLICATIONS

Citrix, Thread: Two factor authentication based on source IP address, Oct. 14-15, 2010, http://forums.citrix.com/message.jspa?messageID=1502780.

SonicWall, Inc., SonicWall Aventail, Eclass Secure Remote Access Installation and Administration Guide Version 10.5, Dec. 3, 2009.

Wikipedia, Apple ID, http://en.wikipedia.org/wiki/Apple_ID, retrieved Nov. 2, 2012.

USPTO, Office Action for U.S. Appl. No. 13/341,197, mailed Jun. 25, 2013.

USPTO, Office Action for U.S. Appl. No. 13/341,202, mailed Apr. 2, 2013.

"Check Point Introduces New Line of Security Management Appliance Based on the Software Blade Architecture", May 26, 2009, http://www.checkpoint.com/press/2009/s,art-1052609.html.

USPTO, Office Action for U.S. Appl. No. 13/341,197, mailed Oct. 15, 2013.

USPTO, Office Action for U.S. Appl. No. 13/341,202, mailed Oct. 15, 2013.

USPTO, Office Action for U.S. Appl. No. 13/463,664, mailed Dec. 4, 2013.

USPTO, Office Action for U.S. Appl. No. 13/463,672, mailed Aug. 8, 2013.

USPTO, Office Action for U.S. Appl. No. 13/341,197, mailed Dec. 30, 2013.

USPTO, Office Action for U.S. Appl. No. 13/341,202, mailed Dec. 17, 2013.

USPTO, Office Action for U.S. Appl. No. 13/463,672, mailed Feb. 19, 2014.

* cited by examiner

SPLIT PASSWORD VAULT

RELATED APPLICATIONS

This application is related to and claims the benefit of U.S. Provisional Patent Application No. 61/482,192, filed May 3, 2011, which is hereby incorporated by reference herein.

FIELD

Embodiments of the invention relate to data loss prevention, and in particular to a split password vault.

BACKGROUND

Data Loss Prevention (DLP) involves computer and information security, where DLP systems identify, monitor, and protect data in use (e.g., endpoint actions), data in motion (e.g., network actions), and data at rest (e.g., data storage). Typically, a DLP system creates fingerprints of confidential information that requires protection and uses the fingerprints to detect the presence of confidential information in various files, messages and the like. Confidential information may be stored in a structured form such as a database, spreadsheet, etc., and may include, for example, customer data, employee data, patient data, pricing data, etc. In addition, the confidential information may include unstructured data such as design plans, source code, financial reports, etc.

Many organizations store large amounts of confidential information in files that are accessible to users within the organization. Since access to this data is essential to the job function of many users within the organization, there are many possibilities for theft or accidental distribution of this confidential information. Theft or benign inadvertent disclosure of confidential information represents a significant business risk in terms of the value of the intellectual property and compliance with corporate policies, as well as the legal liabilities related to government regulatory compliance.

Organizations may also offer one or more cloud services to users over a network (e.g., the Internet). The cloud services may include computation, software, data access, storage services, etc. that physically reside elsewhere (e.g., another computer or the organizations data center) which users can access from their own computer or device over the network. Since confidential information may be sent to or received from these cloud services, corporate policy may limit access to cloud services depending on the user, device, network, etc.

The DLP system may include a single sign on (SSO) solution, that enables a user to access multiple cloud services (e.g., both private cloud services and public cloud services), using a single set of identification credentials. The SSO solution may use a password vault to manage the various individual passwords for different cloud services. Conventionally, ownership of the password vault typically belongs to either the user (e.g., an employee) or to the organization (e.g., the employer, a corporation). In a true converged SSO scenario (i.e., one end-user sign-on for both personal and work services from any device), this leads to challenges when access to work services needs to be added, revoked, changed, or carried forward when there is a change in employment status. In addition, to force cloud service access to a common cloud access broker, employers may want to hide credentials such that the user cannot use the credentials outside the particular broker. There are currently no provisions for employers to provide or supply masked credentials in employee owned password vaults.

SUMMARY

A method and apparatus for access control for cloud services using a split password vault is described. In one embodiment, a cloud service access and information gateway receives, from a user device, a request to access a cloud service. The cloud service access and information gateway determines an identity of a user making the request to access the cloud service and compares the identity of the user to a password vault control policy. The cloud service access and information gateway determines, based on the comparing, one or more sections of a split password vault to which the user has access. The split password vault comprises a first section storing a first set of log-in credentials and a second section storing a second set of log-in credentials. The cloud service may include one of a public cloud service and a private cloud service and the cloud service access and information gateway may be independent of the user device and the cloud service.

In one embodiment, the cloud service access and information gateway determines whether log-in credentials for the requested cloud service are present in the one or more sections of the split password vault to which the user has access. If the log-in credentials are present, the cloud service access and information gateway uses those credentials to provide access to the cloud service. In the password vault, the first section may include a personal password section and the second section may include a corporate password section. The user may have control over management of the first password section and an organization, such as a corporation by which the user is employed, has control over management of the second password section. The cloud service access and information gateway may detect a change in status of the user and, in response to that change, may sever access to the second section of the split password vault.

In addition, a system for access control of cloud services using a split password vault is described. An exemplary system may include a processor and a memory coupled with the processor. In one embodiment, the memory stores a split password vault storing log-in credentials for a plurality of cloud services. The split password vault may include a first section storing a first set of log-in credentials and a second section storing a second set of log-in credentials. In one embodiment, the processor is to receive a request to access a cloud service from a user device. The processor may determine an identity of a user making the request to access the cloud service and compares the identity of the user to a password vault control policy. The processor may determine, based on the comparing, one or more sections of the split password vault to which the user has access.

Further, a computer-readable storage medium for access control of cloud services using a split password vault is described. An exemplary computer readable storage medium provides instructions, which when executed by a processor causes the processor to perform a method such as the exemplary methods discussed above.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
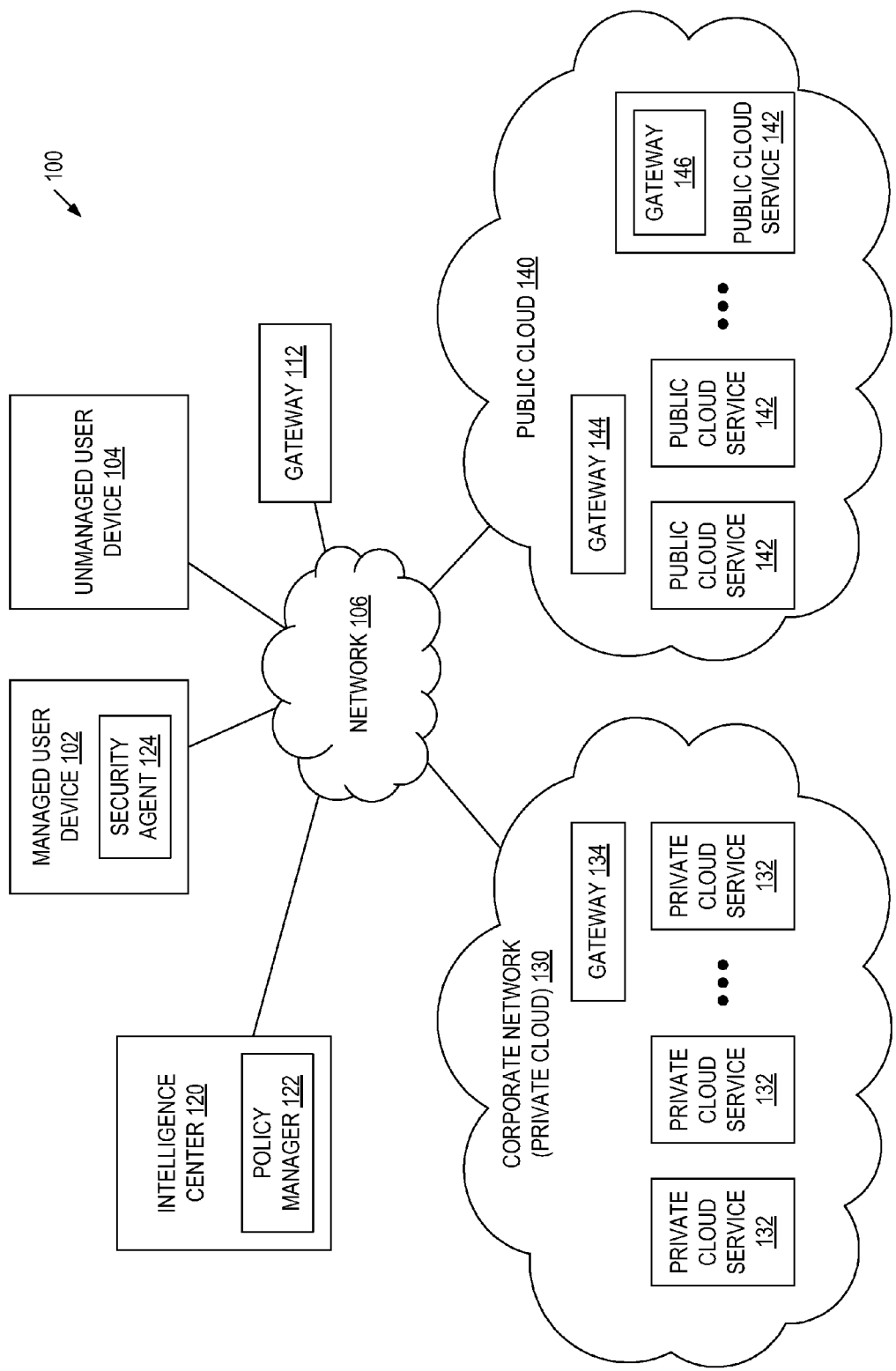
FIG. 1 is a block diagram of an exemplary network architecture, in which embodiments of the present invention may operate.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described for access control for cloud services using a split password vault. In one embodiment an cloud service access and information gateway may be located, for example, somewhere in a network, in a private or public cloud, or in a cloud service. The cloud service access and information gateway receives, from a user device, a request to access a cloud service. The cloud service access and information gateway determines an identity of a user making the request to access the cloud service and compares the identity of the user to a password vault control policy. The cloud service access and information gateway determines, based on the comparing, one or more sections of a split password vault to which the user has access. The split password vault comprises a first section storing a first set of log-in credentials and a second section storing a second set of log-in credentials.

In the password vault, the first section may include a personal password section and the second section may include a corporate password section. The user may have control over management of the first password section and an organization, such as a corporation by which the user is employed, has control over management of the second password section. The split password vault allows the corporation to shift control of access to cloud services away from the cloud services themselves, an into the cloud service access and information gateway. Since the corporation has control over the corporate password section, if there is a change in the user's status, such as for example, he is no longer an employee of the corporation, the corporation can sever the user's access to that section of the split password vault. The effective result is to prevent the user from accessing certain cloud services, such as private cloud services, which may be managed by the corporation. By severing the user's access to the corporate password section, the corporation can deny access to all of the private cloud services at once, rather than having to change access permissions for each individual cloud service. In one embodiment, the user may still retain access and control over the personal password section.

FIG. 1 is a block diagram of an exemplary network architecture 100, in which embodiments of the present invention described herein may operate. The network architecture 100 may include corporate network (i.e., private cloud) 130, public cloud 140 and one or more user devices 102, 104 capable of communicating with the corporate network 130 and public cloud 140 via a network 106. Network 106 may include, for example, a private network such as a local area network (LAN), a wide area network (WAN), a global area network (GAN) such as the Internet, or a combination of such networks, and may include a wired or wireless network.

The user devices 102, 104 may be portable computing devices such as laptop or tablet computers. Other examples of portable computing devices include cellular telephones (e.g., smartphones), personal digital assistants (PDAs), portable media players, netbooks, and the like. The user devices 102, 104 may also be non-portable computing devices such as desktop computers, set-top boxes associated with a television, gaming consoles, and so on. The user devices 102, 104 may be variously configured with different features to enable access to the various cloud services 132, 142 made available by corporate network 130 and public cloud 140.

In one embodiment, the user devices are categorized as managed user devices 102 and unmanaged user devices 104. Managed user devices 102 may include devices provided by the organization or corporation that manages corporate network 130. For example, if a user is an employee of a corporation, the corporation may issue the employee a laptop computer and a smartphone. These devices may or may not be owned by the corporation, but as long as the corporation maintains an element of control over the devices, they may qualify as managed user devices 102. In some embodiments, the corporation may have control over what applications or programs are installed and run on managed user devices 102. For example, managed user devices 102 may have a security agent 124 installed thereon to monitor data sent to and from the managed user device 102, to encrypt or decrypt data transmissions, identify threats or suspicious behavior, etc. In other embodiments, the corporation may exert other forms of control over managed user devices 102.

Unmanaged user devices 104 include all other user devices that do not qualify as managed user devices 102. Unmanaged user devices 104 may include personal devices owned by the user or employee. For example, unmanaged user devices 104 may include a user's home computer or personal cell phone. Generally, the corporation has no control over what applications and programs are installed and run on unmanaged user devices 104, and unmanaged user devices 104 would not typically include security or data loss prevention software, such as security agent 124. In some embodiments, both managed user devices 102 and unmanaged user devices 104 may be used to access various available cloud services.

Cloud computing may refer to the access of computing resources over a computer network. A common shorthand for a cloud computing service (or an aggregation of all existing cloud services) is "the cloud." Cloud computing allows for a functional separation between the computing resources used and the physical machine where the user is working. The computing resources may reside in a local network or outside the local network, for example, in an internet connected datacenter. A user may access the resources in the cloud (e.g., corporate network 130 or public cloud 140) using a personal computer (PC), workstation, laptop computer, mobile phone, personal digital assistant (PDA), tablet computer or the like, including managed user device 102 and unmanaged user device 104. The principle behind the cloud is that any computer connected to the Internet, or other network, is connected to the same pool of computing power, applications, and files. For example, users can store and access personal files, such as music, pictures, videos, and bookmarks, play games, or use productivity applications and cloud services on a remote server rather than physically carrying around a storage medium such as a DVD or hard drive.

Since the cloud is the underlying delivery mechanism, cloud based applications and services may support any type of software application or service in use today. All of the development and maintenance tasks involved in provisioning the applications are performed by a service provider (e.g., the corporation). The user's computer may contain very little software or data (perhaps a minimal operating system and web browser only), serving as little more than a display terminal for processes occurring on a network of computers, potentially located far away. Cloud computing frees users from certain hardware and software installation and maintenance tasks through the use of simpler hardware that accesses a vast network of computing resources (processors, servers, data storage devices, etc.). The sharing of resources reduces the cost to individuals and users may routinely use data intensive applications and services driven by cloud technology which were previously unavailable due to cost and deployment complexity.

In one embodiment, corporate network 130 and public cloud 140 may be implemented in the cloud. Corporate network 130 and public cloud 140 may each include a group of networked computing resources accessible to the user devices 102, 104 over network 106. The resources available in corporate network 130 and public cloud 140 may include, for example, processing devices, storage devices, applications, or other resources. In one embodiment corporate network 130 may be a private cloud that is operated solely for a single organization, such as a corporation. Corporate network 130 may be managed internally by the corporation or by a third-party, and may be hosted internally or externally. Public cloud 140 may represent cloud computing in the more traditional sense, where resources are dynamically provisioned to the general public on a fine-grained, self service basis. Public cloud 140 may provide services and resources from a variety of service providers and may be jointly managed by the providers or managed by a third-party.

In one embodiment, corporate network 130 may include one or more private cloud services 132. Private cloud services 132 may include applications or programs made available to users of user devices 102, 104. Private cloud services 132 may include services created by the organization that manages corporate network 130 (e.g., the corporation) and/or services created by a third party, but provided and managed by the corporation for its users (e.g., employees). Private cloud services 132 may include, for example, an email service, a document management service, a customer relationship management (CRM) service, a video communication service, or some other cloud service. Select users may be afforded access to private cloud services 132 in corporate network 130 using managed user devices 102 or unmanaged user devices 104 over network 106.

In one embodiment, public cloud 140 may include one or more public cloud services 142. Public cloud services 142 may include applications or programs made available to users of user devices 102, 104. Public cloud services 142 may include services created, provided and managed by a variety of different organizations or service providers. Each public cloud service 142 may be used by a user for either personal or business purposes, and some public cloud services 142 may be used for both purposes. Public cloud services 142 may include similar and/or different services as private cloud services 132, such as for example, an email service, a document management service, a social networking service, a customer relationship management (CRM) service, or some other cloud service. When compared to corporate network 130, a larger portion of users (or in one embodiment, all users of the Internet) may be afforded access to public cloud services 142 in public cloud 140 using managed user devices 102 or unmanaged user devices 104.

Network architecture 100 may also be designed with data loss prevention (DLP) features to protect access to private services and confidential information maintained by an organization. Confidential information may be stored in a structured form such as a database, a spreadsheet, etc., and may include, for example, customer, employee, patient or pricing data. In addition, confidential information may include unstructured data such as design plans, source code, financial reports, human resources reports, customer or patient reports, pricing documentation, corporate mergers and acquisitions documentation, government (e.g. Securities and Exchange Commission) filings, and any other confidential information that requires restricted user access. In one embodiment, the data loss prevention may be implemented by intelligence center 120, and a series of one or more security gateways 112, 134, 144, 146.

The data loss prevention features may protect confidential information using DLP policies, which may be controlled by policy manager 122 in intelligence center 120. In one embodiment, intelligence center 120 may be a computing system or a series of computing systems managed, for example, by the organization which manages corporate network 130. In one embodiment, intelligence center 120 may be separate from corporate network 130 as shown, however, in other embodiments, intelligence center 120 may be implemented using computing resources inside corporate network 130. Additional details of policy manager 122 are provided below with respect to FIG. 2.

The design of the data loss prevention features may allow a user or system administrator to define, aggregate and enforce identity, device, information and service centric policies in a uniform, consistent fashion irrespective of whether a user accesses a cloud service with their personal or corporate credentials, from a managed or unmanaged device, from a known or unknown network, or for personal or corporate related purposes. The system combines a cloud federated single sign-on (SSO) solution with the cloud service access and information gateways 112, 134, 144, 146 and the capability to grant or decline cloud service access and/or information access/transfer/transformation based on an individual's validated identity, device and network context (e.g. managed device through an unknown network), information classification policy context and the cloud service context (e.g. web portal vs. financial management application). The SSO solution may allow a user to log-into the DLP system using a single set of credentials (e.g., username and password) and have access, according to the access policies, to all of private cloud services 132 and public cloud services 142 without individually signing-in to each one. Gateways 112, 134, 144, 146 may access a split password vault to determine if the user has the proper credentials for a requested cloud service. Additional details of the split password vault are provided below.

The cloud service access and information gateways 112, 134, 144, 146 may serve as policy enforcement points to enforce the policies set by policy manager 122. For example, a request to access a cloud service, such as private cloud service 132 or public cloud service 142, may be passed through one of the cloud service access and information gateways. The cloud service access and information gateway may compare the request to the conditions of the applicable policy, and enforce an action based on the result of the comparing. The action may include, for example, allowing the request, denying the request, modifying the request, or some other action. In one embodiment, network architecture 100 may include one or more cloud service access and information gateways located at various different locations. For example, cloud service access and information gateway 112 may be connected to or a part of network 106. Communication between the user devices 102, 104 and corporate network 130 and public cloud 140 may be enabled via any communication infrastructure. One example of such an infrastructure includes a combination of a wide area network (WAN) and wireless infrastructure, which allows a user to access the could services. The wireless infrastructure may be provided by one or multiple wireless communications systems. In one embodiment, the wireless communication system may be a wireless fidelity (WiFi) hotspot connected with the network 106. The wireless communication system may also be a wireless carrier system that can be implemented using various data processing equipment, communication towers, etc. Alternatively, or in addition, the wireless carrier system may rely on satellite technology to exchange information with the user devices 102, 104. Cloud service access and information gateway 112 may implemented as part of this infrastructure, such that all communications are able to be intercepted by the gateway 112.

In another embodiment, cloud service access and information gateways may be alternatively or additionally located within corporate network 130, such as gateway 134, and within public cloud 140, such as gateway 144. Since all network traffic passes through one of the gateways, during peak times of high traffic, a bottleneck may form reducing response times. Placing the gateways 134, 144 within corporate network 130 and public cloud 140 respectively, can alleviate this bottleneck, because the amount of traffic passing through each gateway is reduced. Gateway 134 need only handle traffic intended for private cloud services 132 and gateway 144 need only handle traffic intended for public cloud services 142. In another embodiment, gateway 146 may be alternatively or additionally located within a cloud service, such as for example, public could service 142. Additional details of cloud service access and information gateways 112, 134, 144, 146 are provided below with respect to FIG. 3.

Figure 2:
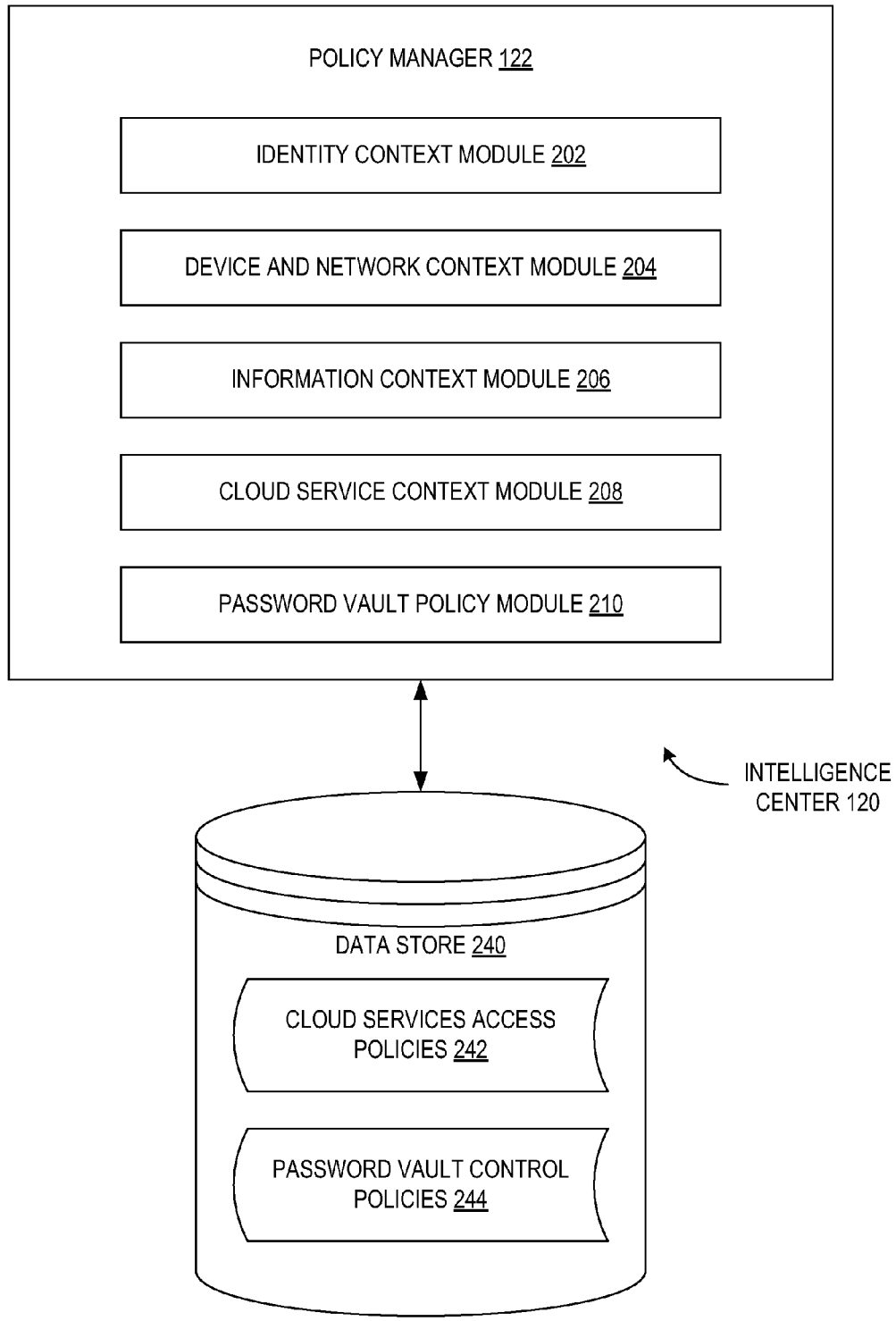
FIG. 2 is a block diagram illustrating an access control policy manager, according to an embodiment.

FIG. 2 is a block diagram of one embodiment of policy manager 122 that is included in intelligence center 120. In one embodiment, policy manager 122 may include identity context module 202, device and network context module 204, information context module 206, cloud service context module 208, and password vault policy module 210. In one embodiment, policy manager 122 is connected to a data store 240, which may be a file system, database or other data management layer resident on a data storage device such as a disk drive, RAM, ROM, database, etc.

Policy manager may be responsible for defining and managing a set of policies defining access to the various cloud services in a network, such as private could services 132 and public could services 142. The resulting policies may be stored in data store 240, for example, as cloud services access policies 242. The policies 242 may be specifically defined for certain access requests or indirectly defined based on a number of factors or contexts. For example, a request that has a certain combination of factors may be treated according to a certain policy. The policies 242 may be created or defined, for example, by a user, system administrator, or other person or entity.

Identity context module 202 is concerned with the identity of the user making a request to access a cloud service. Regardless of the device used to make the request (e.g., managed user device 102 or unmanaged user device 104), a user may identify himself using login credentials. The login credentials may include, for example, a user name and password. In one embodiment, the login credentials are part of a single sign-on (SSO) system. SSO is a property of access control of multiple related, but independent software systems (e.g., private cloud services 132 and public cloud services 142). With SSO, the user logs in once and gains access to all (or a certain subset) of the services without being prompted to log in again at each of them. As different services may support different authentication mechanisms, SSO may internally translate and store different credentials compared to what is used for the initial SSO login.

In one embodiment, the login credentials provided by the user may vary depending on his status. For example, the user may have a certain user name or login if he is a member of a first group, such as being an employee of the corporation that manages corporate network 130. If the user is not a member of the first group, he may have a different set of login credentials, identifying him as such. In addition, the login credentials may provide other information about the user, such as rank, title, position, or other information. Identity context module 202 may interpret different forms of login information to determine the associated identity of a user with those login credentials, and define a corresponding policy. For example, in one embodiment, only users who are employees of the corporation may be allowed to access private cloud services 132, while non-employees are denied access.

Device and network context module 204 is concerned with the type of device and network from which a request to access a cloud service is made. As discussed above, user devices are generally categorized as managed user devices 102 or unmanaged user devices 104. The corporation, or other organization, may have some element of control over managed user device 102, such as requiring that some security software be installed on the managed user device 102, such as security agent 124. Security agent 124 may ensure that the information transferred to and from managed user device 102 is safe and secure. Thus, in one embodiment, device and network context module 204 may define a policy that allows any communication from a managed user device 102 to private cloud services 132. Requests to access cloud services from an unmanaged user device 104 may be denied, according to the policy. In another embodiment, the policy may dictate that such requests from unmanaged user devices 104 be additionally encrypted or otherwise secured.

The network 106 through which the request to access a cloud service is made may also be considered by device and network context module 204. Network 106, may be for example, a secured or unsecured LAN, a WAN, a mobile telecommunications network, or some other network. Device and network context module 204 may define certain access policies 242 based on the type of network as well. For example, only requests from secure networks may be granted access to private cloud services 132. In another embodiment, the location of the network may also be considered when defining the policy. For example, a request made over a wireless network in the United States may be allowed access to certain cloud services, while a request made over a wireless network in Europe may only be granted for a different set of cloud services.

Information context module 206 is concerned with the type of information which is requested to or sent from a cloud service. The information may be classified in any number of different ways, such as corporate or personal, confidential or public, critical or non-critical, etc. Information context module 206 may define certain access policies 242 based on the type of information being communicated. Each of the different contexts, including the information context, may be combined with one or more other contexts when defining the policies 242. In one embodiment, with respect to the information context, a policy may allow corporate data only to be received by a managed user device 102 or sent only to an employee of the corporation.

Cloud service context module 208 is concerned with the type of cloud service for which access is requested. As discussed above, cloud services are generally categorized as private cloud services 132 or public cloud services 142. Private cloud services 132 may include services created by the organization that manages corporate network 130 (e.g., the corporation) and/or services created by a third party, but provided and managed by the corporation for its users (e.g., employees). Public cloud services 142 may include services created, provided and managed by a variety of different organizations or service providers. The cloud service context may also be affected by the type of service requests (e.g., read, write, delete) as well as a service subdomain (e.g., the scope of the requested information) as determined by a more granular URL or URI. The policies 242 may allow access to the different cloud services based on any combination of one or more of the other contexts. For example, a policy may only allow access to private cloud services 132 from a managed user device 102 or over a secured network. One of skill in the art would recognize that there are many other possible combinations that could form the policies beyond those described herein.

Password vault policy module 210 may define policies related to a split password vault. These policies may be stored in data store 240 as password vault control policies 244. In one embodiment, password vault control policies 244 define conditions for when to allow access to one or more sections of a split password vault, when to deny access to certain sections and when to temporarily or permanently sever a user's access to certain sections of the split password vault. For example, password vault control policies 244 may specify that while a user is currently an employee of the corporation that controls policy manager 122, the user be allowed access to both a personal section and a corporate section of a split password vault. In one embodiment, the password vault control policies 244 may specify that once the employee leaves the corporation, their access to the corporate section of the split password vault is severed.

In one embodiment, policy manager 122 creates and manages the policies, such as cloud services access policies 242 and password vault control policies 244 and distributes them to the policy enforcement points (e.g., gateways 112, 134, 144, 146). The policies may be sent to the enforcement points periodically, according to a predefined schedule, each time a change or update is made to one of the policies 242, 244, or in response to a request from a user or system administrator. This may ensure that the gateways 112, 134, 144, 146 are able to make access decisions based on the most recent up-to-date policies.

Figure 3:
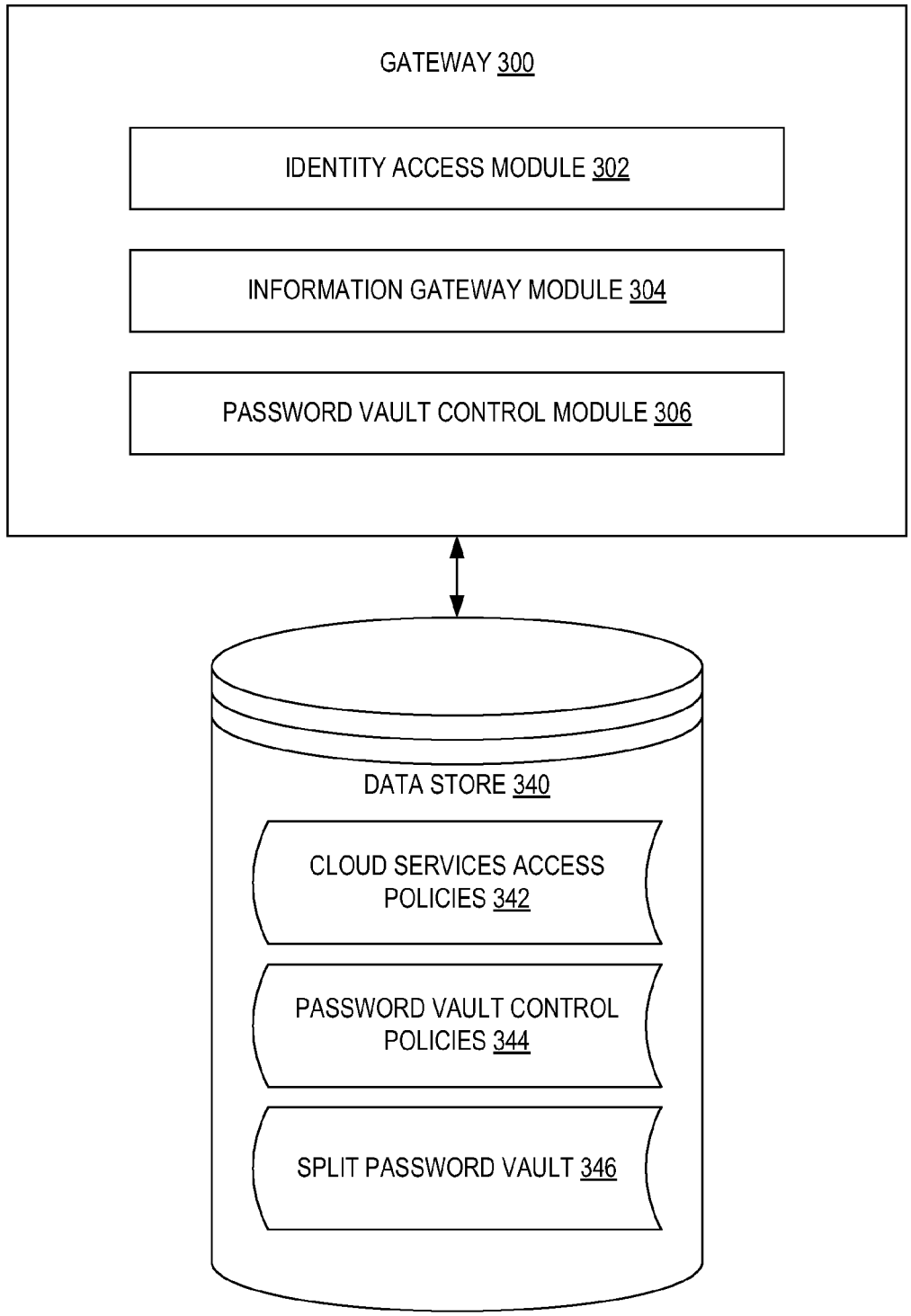
FIG. 3 is a block diagram illustrating an access control gateway, according to an embodiment.

FIG. 3 is a block diagram illustrating an access control gateway, according to an embodiment of the present invention. In one embodiment, gateway 300 may include identity access module 302, cloud service access and information gateway module 304, and password vault control module 306. Access control gateway 300 may be representative of any of cloud service access and information gateways 112, 134, 144, 146, as shown in FIG. 1, and may be located, for example, in network 106, corporate network 130, public cloud 140, in a cloud service, such as public cloud service 142, or elsewhere. In one embodiment, gateway 300 is connected to a data store 340, which may be a file system, database or other data management layer resident on a data storage device such as a disk drive, RAM, ROM, database, etc.

In one embodiment, gateway 300 may intercept or otherwise receive an access request. The request may be sent, for example, by managed user device 102 or unmanaged user device 104 to access a cloud service, such as private cloud service 132 or public cloud service 142. In one embodiment, the request may include information about the request, such as an identity of the user making the request, information about the device and network from which the request was made, including security information from the user device, a type of information being transmitted or requested, an indication of the cloud service to which the request is directed, and/or other information. Gateway 300 may use this information to make an access determination according to one or more access policies, such as cloud services access policies 342, which may be stored in data store 340. Cloud services access policies 342 may be generated and distributed by a policy manager, such as policy manager 122 in intelligence center 120.

Upon receiving the access request, identity access module 302 examines the request and makes a determination of which of cloud services access policies 342 are applicable. In one embodiment, identity access module 302 identifies an identity of the user making the request, information about the device from which the request was made, including security information from the user device and information about the network on which the request was received. In response, identity access module 302 may determine if the request should be allowed for a given cloud service according to the policies 342. For example, identity access module 302 may determine that the request is received from an employee of the corporation, on a managed device, such as managed user device 102, and received on a secure wireless network 106. The policy 342 may dictate that a request with that particular combination of features should be allowed for either private cloud services 132 or public cloud services 142. In one embodiment, the policy 342 may specify individual cloud services that may or may not be accessed, rather than just a class of services.

In one embodiment, either before or after, or in some cases at the same time that identity access module 302 verifies the identity of the request, cloud service access and information gateway module 304 may examine the request and make a determination of whether to allow the request based on policies 342. Cloud service access and information gateway module 304 may identify a type of information that the access request is either sending to a cloud service or requesting from the cloud service. The information may be classified in any number of different ways, such as corporate or personal, confidential or public, critical or non-critical, etc. For example, cloud service access and information gateway module 304 may determine that the user is attempting to download corporate sales data from a private cloud service 132. In one embodiment, the policy 342 may specify that such information is allowed to be downloaded by corporate employees, or by anyone using a managed user device 102, or by some combination of these or other factors.

Upon receiving the access request, password vault control module 306 examines the request and makes a determination of which sections of a split password vault 346 should be accessible. In one embodiment, this determination may be based on password vault control policies 344. Password vault control policies 344 may be generated and distributed by a policy manager, such as policy manager 122 in intelligence center 120. In one embodiment, password vault control policies 344 define conditions for when to allow access to one or more sections of split password vault 346, when to deny access to certain sections and when to temporarily or permanently sever a user's access to certain sections of the split password vault 346.

In one embodiment, password vault control module 306 may receive an indication of the user's identity from identity access module 302. The user's identity may include a user's status, login credentials, the type of user device from which the request was received (e.g., managed user device 102 or unmanaged user device 104), or some other identifying feature. Password vault control policies 344 may specify that for certain login credentials, user devices, or some combination of these, the user be allowed access to both a personal section and a corporate section of split password vault 346. Password vault control module 306 may compare the determined user identity information to password vault control policy 344 to determine which, if any, sections of split password vault 346 should be accessible to the user.

If password vault control module 306 determines that the user should have access to a certain section of split password vault 346, password vault control module 306 may retrieve the login credentials stored in that section of the vault 346. If that section includes credentials for the requested cloud service (e.g., private cloud service 132 or public cloud service 142), gateway 300 uses those login credentials to provide access to the cloud service. Additional details of split password vault 346 are provided below with respect to FIG. 4.

Figure 4:
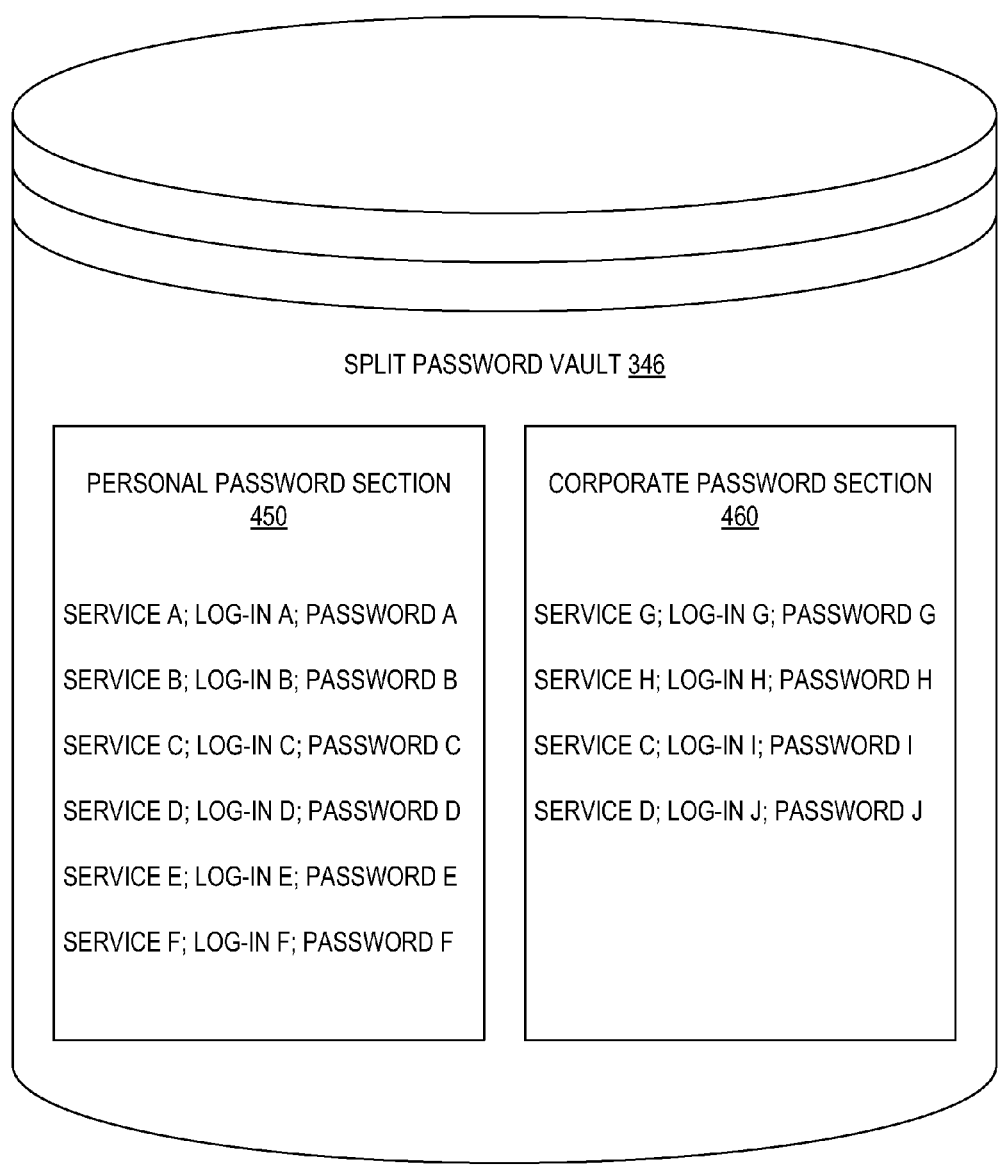
FIG. 4 is a block diagram illustrating a split password vault, according to an embodiment.

FIG. 4 is a block diagram illustrating a split password vault, according to an embodiment of the present invention. In one embodiment, split password vault 346 includes personal password section 450 and corporate password section 460. Each section may store a list, table, etc. of one or more cloud services and the corresponding log-in credentials (e.g., log-in identifier and password) for each cloud service. In FIG. 4, only two sections are illustrated for ease of explanation, however, it should be understood that in other embodiments, split password vault 346 may include any number of different and/or additional sections.

Personal password section 450 may be one section of split password vault 346 reserved for a user's personal credentials. Personal password section 450 may be managed completely by the user, such that the user has the ability to add or remove log-in credentials. As illustrated, personal password section 450 may include a number of credential sets that each includes an indication of the associated cloud service (i.e., Service A), an associated log-in (i.e., Log-In A) and a password (i.e., Password A). A user may create these sets of credentials for certain cloud services that they wish to access through the SSO system. The credentials may be for either private cloud services 132 or public cloud services 142. In one embodiment, an organization, such as a corporation that employs the user, may have no access to or control over personal password section 450.

Corporate password section 460 may be another section of split password vault 346 reserved for a user's corporate credentials. Corporate password section 460 may be jointly managed by the user and the corporation, such that while the user has the ability to add or remove log-in credentials, the corporation also has the same or similar rights. As illustrated, corporate password section 460 may include a number of credential sets that each includes an indication of the associated cloud service, an associated log-in and a password. In one embodiment, the credentials in corporate password section 460 may be for different cloud services (e.g., Service G) than those in personal password section 450, however in some embodiments, corporate password section 460 may have corporate credentials for one cloud service (e.g., Service C) that also has a set of personal credentials stored in personal password section 450. Either the user or the corporation may create the sets of credentials in corporate password section for the cloud services that they wish to access (or allow the user to have access to) through the SSO system.

In one embodiment, the personal password section 450 and corporate password section 460 are joined together, so that the user may access credentials in either section depending on the cloud service he is attempting to access. When the user initially logs-in to the SSO system, he is afforded access to a set of cloud services without having to individually log-in to each cloud service. The individual log-in information may be stored in split password vault 346. In one embodiment, gateway 300 may automatically obtain the needed credentials from split password vault 346 in response to receiving a request to access a particular cloud service.

As part of the corporation's control over corporate password section 460, the corporation may also have the ability to temporarily or permanently deny a user access to the corporate password section 460. If there is a change in the user's status, such as for example, he is no longer an employee of the corporation, the corporation can prevent the user from accessing the corporate password section 460. Access permissions for the split password vault 346 may be changed so that requests from a particular user are denied. The effective result is to prevent the user from accessing certain cloud services, such as private cloud services 132, which may be managed by the corporation. By severing the user's access to corporate password section 460, the corporation can deny access to all of the private cloud services 132 at once, rather than having to change access permissions for each individual cloud service. In one embodiment, the user may still retain access and control over personal password section 450.

Figure 5:
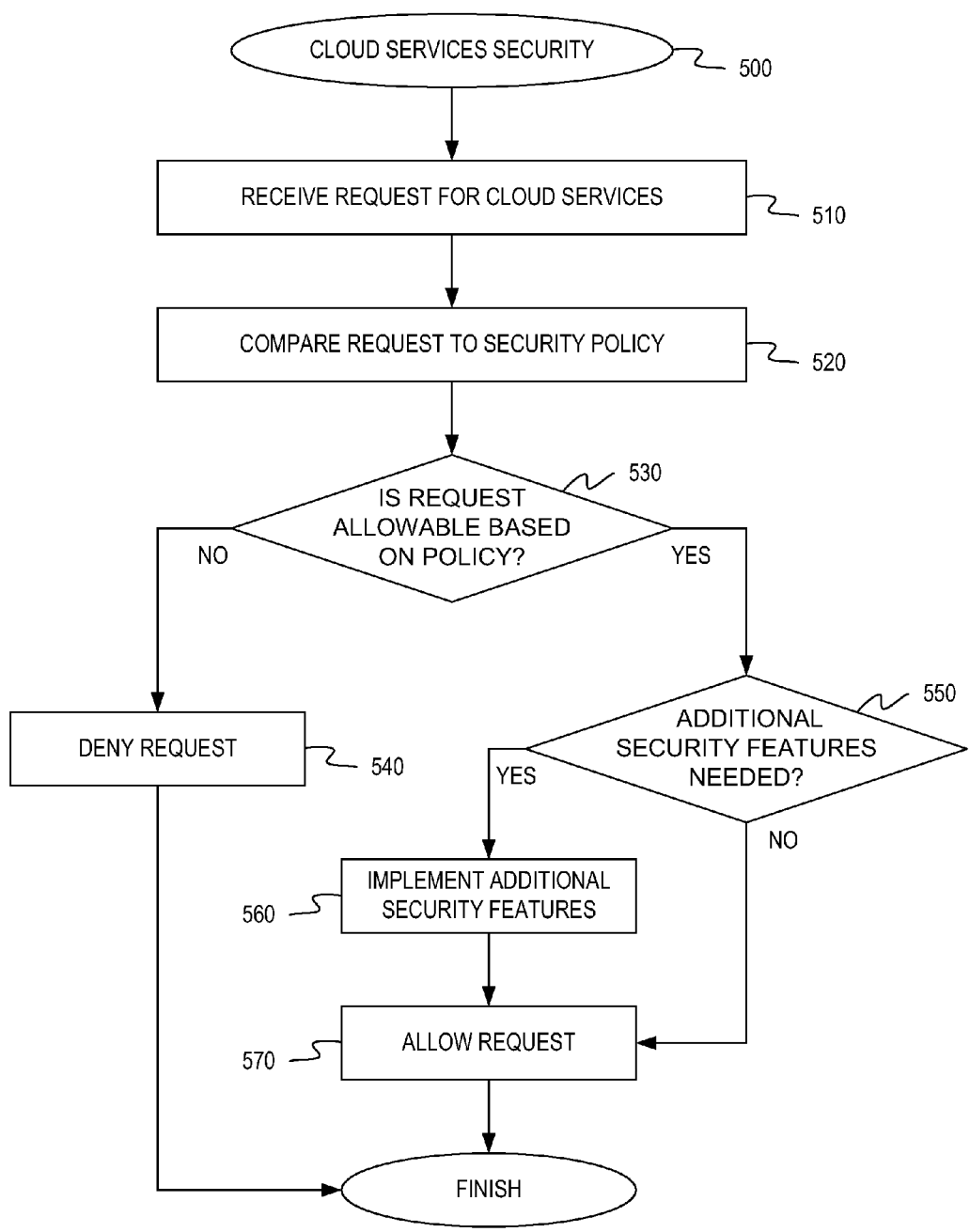
FIG. 5 is a flow diagram illustrating a cloud services security method, according to an embodiment.

FIG. 5 is a flow diagram illustrating a cloud services security method, according to an embodiment of the present invention. The method 500 may be performed by processing logic that comprises hardware (e.g., circuitry, dedicated logic, programmable logic, microcode, etc.), software (e.g., instructions run on a processor to perform hardware simulation), or a combination thereof. The processing logic is configured to monitor requests for access to cloud services made by user devices. In one embodiment, method 500 may be performed by cloud service access and information gateway 300, as shown in FIG. 3.

Referring to FIG. 5, at block 510, method 500 receives a request to access cloud services. In one embodiment, the request may be sent by a user device, such as managed user device 102 or unmanaged user device 104. The request may be for access to a cloud service, such as private cloud services 132 or public cloud services 142. In one embodiment, cloud service access and information gateway 300, which may include for example one of gateways 112, 134, 144 or 146, may intercept or otherwise receive the access request.

At block 520, method 500 may analyze the request and compare the request to a set of one or more security policies, such as cloud services access policies 342. Cloud services access policies 342 may include policies generated and distributed by a policy manager, such as policy manager 122 in intelligence center 120. The policies 342 may be sent to gateway 300 periodically, according to a predefined schedule, each time a change or update is made to one of the policies, or in response to a request from a user or system administrator.

At block 530, method 500 determines whether the request is allowable based on the cloud services access policy 342. In one embodiment, identity access module 302 of gateway 300 identifies an identity of the user making the request, information about the device from which the request was made and information about the network on which the request was received. In response, identity access module 302 may determine if the request should be allowed for a given cloud service according to the policy 342. For example, the policy 342 may specify that a request with a particular combination of features should or shout not be allowed for either private cloud services 132 or public cloud services 142. In addition, cloud service access and information gateway module 304 may identify a type of information that the access request is either sending to a cloud service or requesting from the cloud service. The information may be classified in any number of different ways, such as corporate or personal, confidential or public, critical or non-critical, etc. In one embodiment, the policy 342 may specify that certain types of information are allowed to be downloaded by certain users, devices, etc.

If at block 530, method 500 determines that the access should not be granted for the requested cloud service, at block 540 method 500 may deny the access request. As a result the requesting device is not allowed access to the cloud service. If at block 530, method 500 determines that the access should be granted fore the requested cloud services according to policy 342, method 500 optionally proceeds to block 550. At block 550, method 500 optionally determines if additional security features are needed. In one embodiment, the cloud services access policy 342 may specify that a certain level of security is required on the user device 102, 104. If the current security features of the device do not meet the requirements of the policy, at block 560, method 500 optionally implements the additional security features. In one embodiment, method 500 may upgrade the security software on user device 102, install a security agent 124 on user device 102, or otherwise upgrade or improve the device security. If at block 550, method 500 determines that additional security features are not needed, at block 570, method 500 allows the request. Gateway 300 may forward the request for access to the intended cloud service, such as private cloud service 132 or public cloud service 142.

Figure 6:
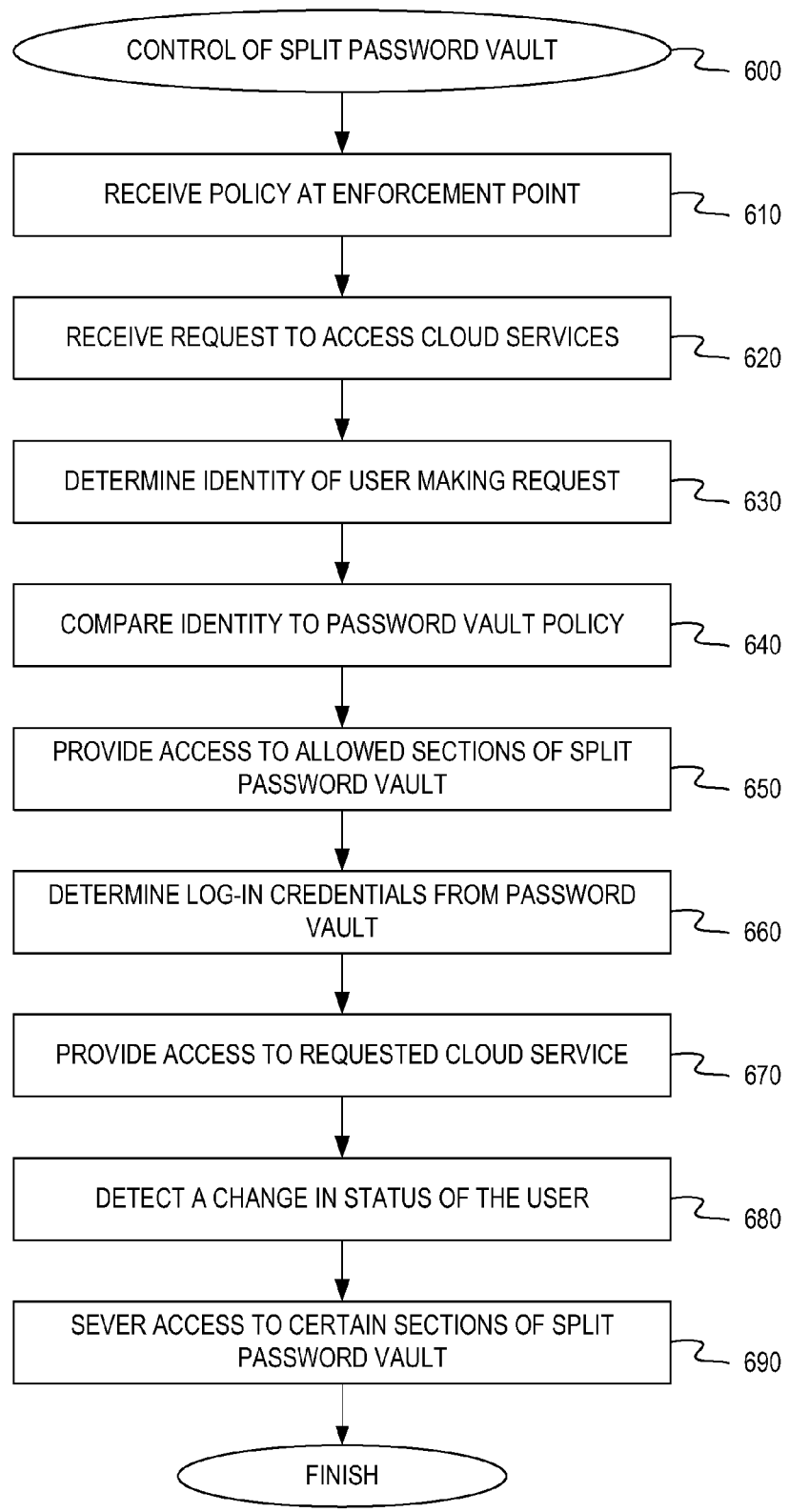
FIG. 6 is a diagram illustrating a method for controlling a split password vault, according to an embodiment.

FIG. 6 is a diagram illustrating a method for controlling a split password vault, according to an embodiment of the present invention. The method 600 may be performed by processing logic that comprises hardware (e.g., circuitry, dedicated logic, programmable logic, microcode, etc.), software (e.g., instructions run on a processor to perform hardware simulation), or a combination thereof. The processing logic is configured to monitor requests to access cloud services and control a split password vault. In one embodiment, method 600 may be performed by cloud service access and information gateway 300, as shown in FIG. 3.

Referring to FIG. 6, at block 610, method 600 receives a policy, such as password vault control policy 344 at an enforcement point. In one embodiment, the enforcement point is an cloud service access and information gateway 300. The cloud service access and information gateway may be located in the network 106 (e.g., gateway 112), in corporate network 130 (e.g., gateway 134), in public cloud 140 (e.g., gateway 144) on within a cloud service (e.g., gateway 146). The policy 344 may be provided by policy manager 122 in intelligence center 120. In one embodiment, the policy 344 specifies conditions for when to allow or deny access to one or more sections of split password vault 346.

At block 620, method 600 receives a request to access cloud services. In one embodiment, the request may be sent by a user device, such as managed user device 102 or unmanaged user device 104. The request may be for access to a cloud service, such as private cloud services 132 or public cloud services 142. In one embodiment, cloud service access and information gateway 300 may intercept or otherwise receive the access request.

At block 630, method 600 determines an identity of a user making the request to access a cloud service. In one embodiment, identity access module 302 of gateway 300 identifies an identity of the user making the request, information about the device from which the request was made and/or information about the network on which the request was received. The identity may include an identifier of the individual user or an identifier of a class of user (e.g., the user's status). The identity of the user may be provided by the user in the form of an SSO log-in credential. Also, depending on the type of device the user has (e.g., managed user device 104), the user may be assigned a certain status (e.g., employee). Identity access module 302 may provide an indication of the user's identity to password vault control module 306.

At block 640, method 600 may compare determined identity to a set of one or more security policies, such as password vault control policies 344. Password vault control policies 344 may include policies generated and distributed by a policy manager, such as policy manager 122 in intelligence center 120. The policies 344 may be sent to gateway 300 periodically, according to a predefined schedule, each time a change or update is made to one of the policies, or in response to a request from a user or system administrator. Password vault control module 306 may use password vault control policies 344 to determine which, if any, sections of split password vault 346, the user is entitled to access. Policies 344 may contain a table, list, or other data structure including which sections, such as personal password section 450 or corporate password section 460, a user with a certain identity, device, or some combination of these, is allowed to access.

At block 650, method 600 provides access to the allowed sections of the split password vault 346. If one embodiment, if the user has a first status (e.g., the user is an employee of the corporation), the user may be provided access to both personal password section 450 and corporate password section 460. In another embodiment, if the user has a second status (e.g., the user is not an employee of the corporation), the user may be provided access only to personal password section 450 and denied access to corporate password section 460.

At block 660, method 600 determines the log-in credentials for the requested cloud service from the split password vault 346. In one embodiment, for example, the credentials for a private cloud service 132 may be stored in corporate password section 460. Thus, if the user is granted access to corporate password section 460 at block 650, password vault control module 306 can automatically retrieve the log-in credentials for the private cloud service 132.

At block 670, if the proper log-in credentials for the requested cloud service are obtained from split password vault 346, gateway 300 automatically provides the log-in credentials to the cloud service, thereby providing the requested access to the cloud service.

At block 680, method 600 may detect a change in a status of the user. The change in status may be, for example, that the user is no longer an employee of the corporation that manages split password vault 346. The change may be detected by analyzing the identity of the user received with the request, or in another embodiment, a system administrator may manually update the user's status. In response to detecting the change in status, at block 690, method 600 may sever access to certain sections of split password vault 346. For example, password vault control module 306 may change the access permissions, so that the user is no longer allowed to access corporate password section 460. By severing the user's access to corporate password section 460, the corporation can deny access to all of the private cloud services 132 at once, rather than having to change access permissions for each individual cloud service.

Figure 7:
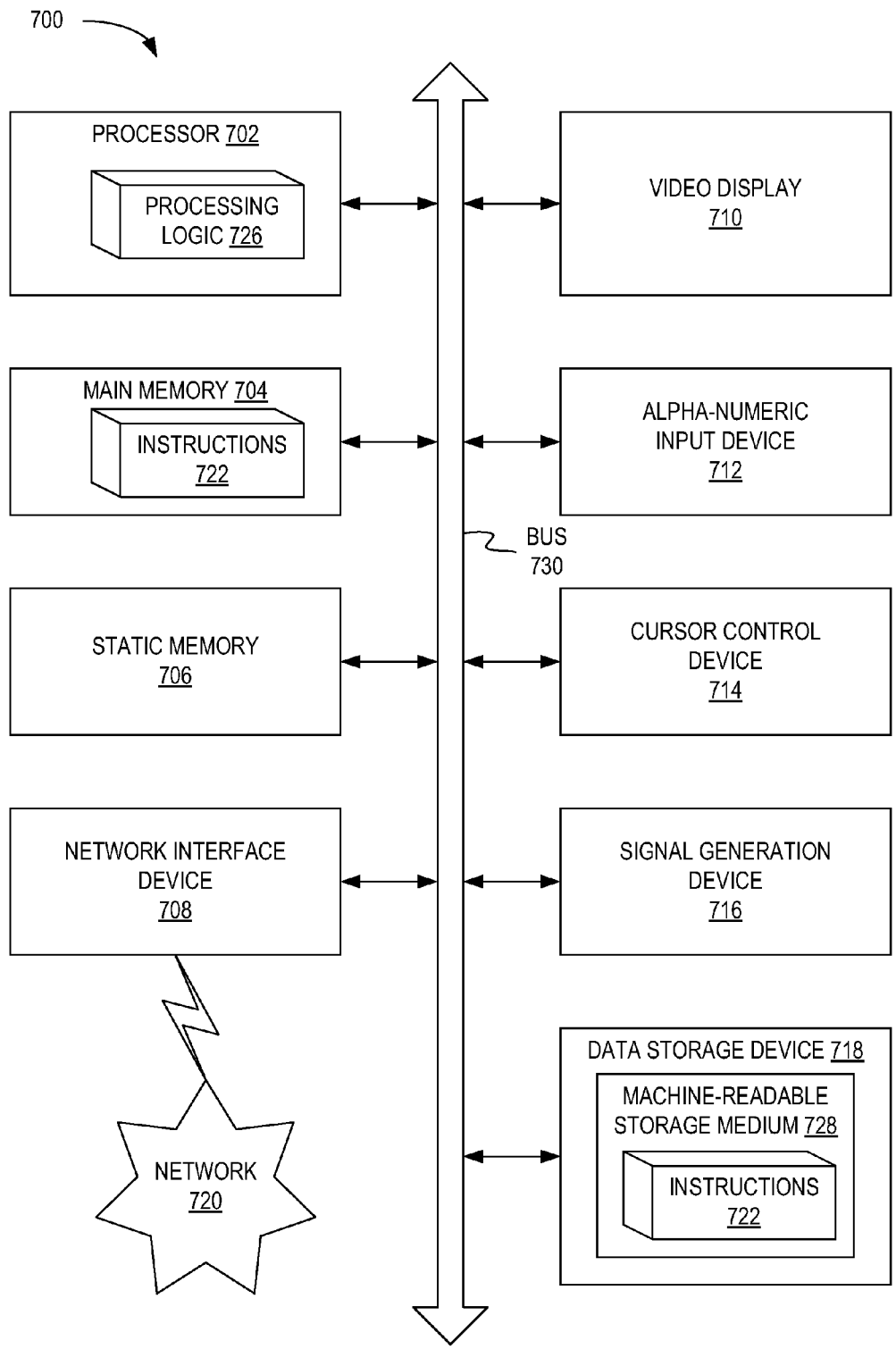
FIG. 7 is a block diagram illustrating one embodiment of a computer system, according to an embodiment.

FIG. 7 illustrates a diagrammatic representation of a machine in the exemplary form of a computer system 700 within which a set of instructions, for causing the machine to perform any one or more of the methodologies discussed herein, may be executed. The system 700 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may represent intelligence center 120 in FIG. 1 and/or gateway 300 in FIG. 3.

The exemplary computer system 700 includes a processing system (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 718, which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 may be configured to execute the cloud service access and information gateway 300 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-readable medium 728 on which is stored one or more sets of instructions 722 (e.g., instructions of gateway 300) embodying any one or more of the methodologies or functions described herein. The instructions 722 may also reside, completely or at least partially, within the main memory 704 and/or within processing logic 726 of the processor 702 during execution thereof by the computer system 700, the main memory 704 and the processor 702 also constituting computer-readable media. The instructions may further be transmitted or received over a network 720 via the network interface device 708.

While the computer-readable storage medium 728 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
    receiving, from a user device, a request to access a cloud service;
    determining an identity of a user making the request to access the cloud service;
    comparing, by a processor, the identity of the user to a password vault control policy; and
    determining, based on the comparing, one or more sections of a split password vault to which the user has access, the split password vault comprising a first section storing a first set of log-in credentials and a second section storing a second set of log-in credentials, wherein the user has control over management of the first section of the split password vault and an organization associated with the user has control over management of the second section of the split password vault.

2. The method of claim 1, further comprising:
    determining whether log-in credentials for the cloud service are present in the one or more sections of the split password vault to which the user has access; and
    if the log-in credentials are present, providing access to the cloud service.

3. The method of claim 1, wherein the user has control over management of the first password section and an organization has control over management of the second password section.

4. The method of claim 1, wherein the first section of the split password vault comprises a personal password section and the second section of the split password vault comprises a corporate password section.

5. The method of claim 1, wherein a cloud service access and information gateway compares the identity of the user to the password vault control policy.

6. The method of claim 5, wherein the cloud service access and information gateway is independent of the user device and the cloud service.

7. The method of claim 1, further comprising:
    detecting a change in status of the user; and
    severing access to the second section of the split password vault.

8. A system, comprising:
    a processor; and
    a memory coupled with the processor, the memory storing:
        a split password vault storing log-in credentials for a plurality of cloud services, the split password vault comprising a first section storing a first set of log-in credentials and a second section storing a second set of log-in credentials, wherein the user has control over management of the first section of the split password vault and an organization associated with the user has control over management of the second section of the split password vault.

9. The system of claim 8, wherein the processor is configured to:
    receive, from a user device, a request to access one of the plurality of cloud services;
    determine an identity of a user making the request to access the cloud service;
    compare the identity of the user to a password vault control policy; and
    determine, based on the comparing, one or more sections of the split password vault to which the user has access.

10. The system of claim 9, wherein the processor is further configured to:
    determine whether log-in credentials for the cloud service are present in the one or more sections of the split password vault to which the user has access; and
    if the log-in credentials are present, provide access to the cloud service.

11. The system of claim 8, wherein the user has control over management of the first password section and an organization has control over management of the second password section.

12. The system of claim 8, wherein the first section of the split password vault comprises a personal password section and the second section of the split password vault comprises a corporate password section.

13. The system of claim 9, wherein a cloud service access and information gateway compares the identity of the user to the password vault control policy, and wherein the cloud service access and information gateway is independent of the user device and the cloud service.

14. The system of claim 9, wherein the processor is further configured to:
    detect a change in status of the user; and
    sever access to the second section of the split password vault.

15. A non-transitory computer readable storage medium including instructions that, when executed by a processor, cause the processor to perform operations comprising:
    receiving, from a user device, a request to access a cloud service;
    determining an identity of a user making the request to access the cloud service;
    comparing, by the processor, the identity of the user to a password vault control policy; and
    determining, based on the comparing, one or more sections of a split password vault to which the user has access, the split password vault comprising a first section storing a first set of log-in credentials and a second section storing a second set of log-in credentials, wherein the user has control over management of the first section of the split password vault and an organization associated with the user has control over management of the second section of the split password vault.

16. The non-transitory computer readable storage medium of claim 15, wherein the operations further comprise:
    determining whether log-in credentials for the cloud service are present in the one or more sections of the split password vault to which the user has access; and
    if the log-in credentials are present, providing access to the cloud service.

17. The non-transitory computer readable storage medium of claim 15, wherein the user has control over management of the first password section and an organization has control over management of the second password section.

18. The non-transitory computer readable storage medium of claim 15, wherein the first section of the split password vault comprises a personal password section and the second section of the split password vault comprises a corporate password section.

19. The non-transitory computer readable storage medium of claim 15, wherein s cloud service access and information gateway compares the identity of the user to the password vault control policy, and wherein the cloud service access and information gateway is independent of the user device and the cloud service.

20. The non-transitory computer readable storage medium of claim 15, wherein the operations further comprise:
    detecting a change in status of the user; and
    severing access to the second section of the split password vault.

\* \* \* \* \*